June 24, 1969  E. G. HAGELIN ET AL  3,451,696
METHOD FOR SEALING JOINTS AND THE LIKE
Filed May 2, 1966
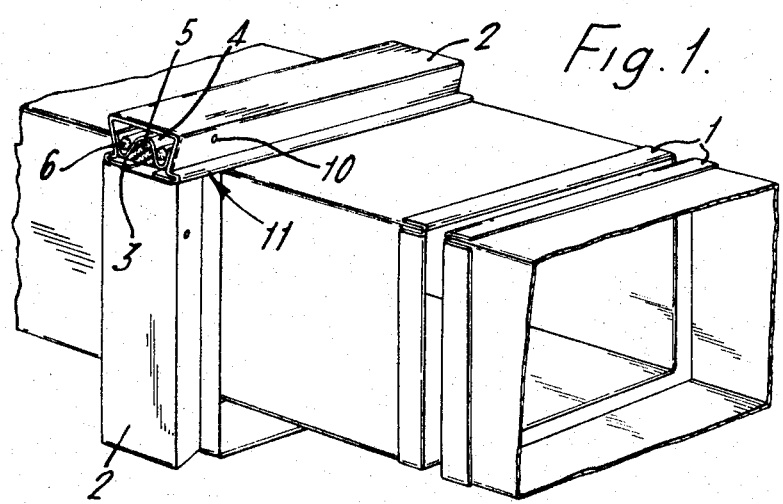
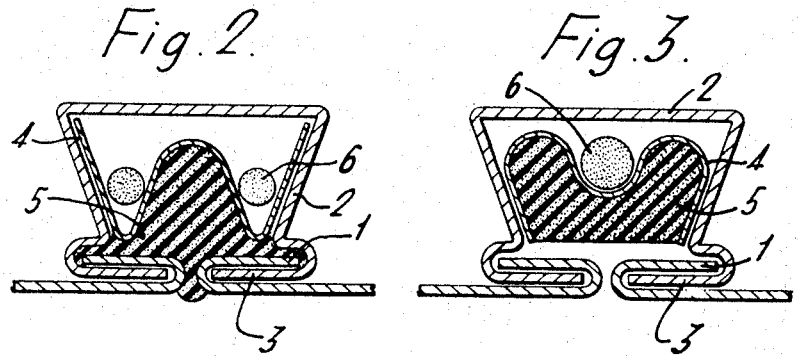
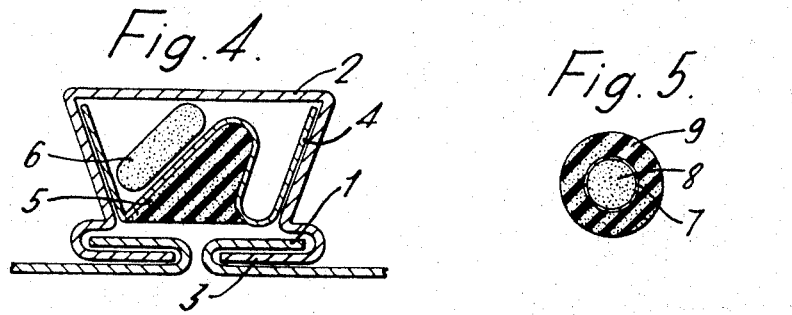

_United States Patent Office_

3,451,696
Patented June 24, 1969

3,451,696
METHOD FOR SEALING JOINTS AND THE LIKE
Erik Gustav Hagelin and Eric Folke Odel Lenngren, Norrkoping, Sweden, assignors to United Shoe Machinery Company AB, Abyvagen, Orebro, Sweden, a corporation of Sweden
Filed May 2, 1966, Ser. No. 546,778
Claims priority, application Sweden, May 5, 1965, 5,885/65; May 31, 1965, 7,093/65; Jan. 10, 1966, 2,421/66
Int. Cl. F16l *13/02, 25/00;* B32b *5/20*
U.S. Cl. 285—21                                6 Claims

ABSTRACT OF THE DISCLOSURE

The subject matter of this disclosure consists in a sealed joint—such as a joint between two conduit-like hollow members, and in a method of forming such joint and sealing the same in situ.

---

This invention relates to sealings and refers particularly to sealing joints, seams and the like by applying an expanding sealing agent.

Leaky joints and seams give rise to considerable problems, as it is clearly proved by inspections of ventilating ducts, chimney flues and the like. By such inspections it was discovered the reason why in many cases the ventilating of dwellings, offices and industrial premises do not meet the requirements set by the authorities. Although the capacity of the ventilating ducts is fully satisfactory, the leakage is substantial. The inspections have further shown that the greatest part of the leakage is caused in the joints of the ducts.

According to an investigation carried out by a Swedish governmental authority the leakage of ventilating ducts of sheet metal provided with so-called guide jointing which is the most usual jointing method, exceeds ten times the maximum values set by the Swedish Ministry of Housing for permissible leakage in ventilating ducts. The test ducts were taken from newly constructed buildings, and they were manufactured and mounted with normal accuracy by ventilation sheet metal workers.

There exist a great number of different methods for solving the aforesaid jointing problem. A sealing strip of some type, for example, is applied in the joint whereafter the joint edges are pressed together and sealed, for instance by pushing a joint bar over the edges. This method, however, has not proved reliable, to a large extent because of the highly troublesome and time-consuming work of pressing together a joint with a sealing strip between the joint edges and thereafter mounting the joint bar.

A great number of the conventional methods used for sealing such joints, moreover, require the utilization of a plurality of single parts. According to one method for jointing rectangular ducts, for example, not less than 24 details are used for one jointing. It is obvious that such joints involve a great risk of faulty mounting and direct carelessness, particularly when as in many cases thousands of joints have to be mounted in one and the same premise. The number of leaks will be very great, even if the joints are mounted in a correct manner.

In order to produce joints which are absolutely tight and eliminate the aforesaid disadvantages, the present invention proposes a simple, cheap and effective method of sealing joints by an expandible sealing agent.

The characterizing features of the invention are defined in the accompanying claims.

The invention is described in the following wherein reference is made to the accompanying drawings showing an embodiment of the invention.

FIG. 1 shows a perspective view of a sealing device according to the invention in mounted state, FIG. 2 shows a cross-section of the sealing device according to FIG. 1 after the sealing agent was caused to expand, FIGS. 3 and 4 show cross-sections of different embodiments of the sealing device, and FIG. 5 shows a different embodiment of the insert.

As appears from the drawings, the shown embodiment of the invention is based on the utilization of the jointing method which is the most usual, cheapest and simplest, i.e. guide jointing. According to the invention only one unit is used, the joint bar 2, which preferably already during its manufacture is provided with a sealing agent 5. Thus, the fitter need not think of applying the sealing agent, but only has to push the joint bar in the usual manner over the joint. This is easily done, because the joint edges need not be forced together, but are very easily combined. After the completed mounting of a joint the sealing agent can be brought to expand, but it is more practical to carry out the expanding process after the mounting of an entire duct or installation is completed, because in such a case the fitters can mount a duct or installation continuously without interruption.

According to a characterizing feature of the invention, the sealing agent is applied in the joint or in connection to the joint preferably already during the manufacture of the details.

The joint bar may be provided with sealing agent, for example, by injecting a layer along the bottom of the bar or by glueing a strip of the sealing agent along the same. In a corresponding manner, the sealing agent may be applied to one or both of the joint edges already prior to the transport of the parts of the ventilating ducts to their place of mounting.

FIGS. 1, 3 and 4 show a joint bar 2 provided with an insert 4 which contains the sealing agent 5 and the pyrotechnical agent 6. In the embodiment shown the insert 2 is shaped like a W, the sealing agent being applied in the central hollow space and the pyrotechnical agent in one or both of the outer upper hollow spaces. The joint bar 2 is provided with ignition holes 10 for the pyrotechnical agent, which holes preferably are placed at the ends.

The joint bar and the insert are delivered to the mounting place as one unit and are immediately ready for use.

FIG. 5 shows a different embodiment of the insert in the joint bar. A layer 9 of the sealing agent is applied about a tube 7 which may be filled with a pyrotechnical substance 8 or contain a layer of a pyrotechnical agent. If desired, the tube 7 may be empty for passing therethrough a stream of hot air, steam or the like or to be heated electrically.

An insert designed in the said manner can be used without a joint bar for sealing spaces other than at joints and it may be manufactured in the form of cables or rods and be cut to suitable length on the place of its application.

When considering the conventional methods comprising the utilization of a great number of different details for sealing and jointing, the present invention involves obviously a rationalization of the sealing method, because it is carried out at the same time as the jointing and without having to observe the sealing problem during the mounting.

As sealing agent may be used any known agent adapted to be applied in the manner described and to be expanded to one or several times its original volume by means of, for example, heat, in such a manner, that the agent is vulcanized or cured and maintains its elasticity or plasticity after the expansion. The sealing agent suitably may be a composition consisting essentially of neoprene rubber admixed with a conventional expanding agent and conventional curing agent for the rubber.

A suitable pyrotechnical agent for carrying out the method is a mixture of ferro-silicon (or iron,) pyrolusite, barium nitrate, charcoal, binding agent and water, but also other suitable mixtures or agents can be imagined. The different components are adjusted relative one another according to the requirements of temperature and combustion speed. The ready product is preferably manufactured in the form of rods or is injected directly into the insert section 4.

The present invention includes a.o. the advantage that subsequent to the expansion of the sealing agent, for example at a ventilating duct, a coherent sealing of the joint is obtained, due to the fact that every joint bar covers the end of the next foregoing joint bar.

As a further advantage of the invention can be mentioned that clatter and other disturbing noises which usually occur in ventilating ducts of sheet metal, are entirely eliminated, due to the fact that the sealing agent penetrates during the expansion into every hollow and intermediate space and dampens effectively all clattering noises, at the same time as the duct is stiffened in the joints.

It is obvious that embodiments and modes of application other than described and shown can be imagined within the scope of the invention. The invention appears, for example, also suitable for use in sealings about windows, particularly in connection with evacuated windows, and in general for use instead of other types of sealings.

What we claim is:

1. Joint of the type in which the members to be joined at their edges are provided with turned back flanges directed away from the joint and a joint bar having a substantially U-shaped cross-section and edge portions directed towards each other which joint bar is slidable along the joint with said edge portions in engagement with said flanges, in which joint said joint bar encloses a strip of sealing agent which is heat-expandable and, after cooling, retains the volume obtained by heat treatment, together with a pyrotechnical agent which extends along said strip of sealing agent and, when ignited, provides heat for the expansion of said sealing agent.

2. Joint as claimed in claim 1, in which said joint bar is provided with a number of holes for the ignition of said pyrotechnical agent.

3. Joint of the type in which the members to be joined at their edges are provided with turned back flanges directed away from the joint and a joint bar having a substantially U-shaped cross-section and edge portions directed towards each other, which joint bar is slidable along the joint with said edge portions in engagement with said flanges, in which joint said joint bar encloses a strip of sealing agent which is heat-expandable and, after cooling, retains the volume obtained by heat treatment, together with a pyrotechnical agent which extends along said strip of sealing agent and, when ignited, provides heat for the expansion of said sealing agent, said sealing agent and said pyrotechnical agent being supported by an insert extending along said joint bar.

4. Joint as claimed in claim 3, in which said joint bar and said insert are provided with holes for ignition of said pyrotechnical agent.

5. Joint of the type in which the members to be joined at their edges are provided with turned back flanges directed away from the joint and a joint bar having a substantially U-shaped cross-section and edge portions directed towards each other which joint bar is slidable along the joint with said edge portions in engagement with said flanges, in which joint said joint bar encloses a strip of sealing agent which is heat-expandable and, after cooling, retains the volume obtained by heat treatment, together with a pyrotechnical agent which extends along said strip of sealing agent and, when ignited, provides heat for the expansion of said sealing agent, said sealing agent forming an outer layer on a tubular insert extending along said joint bar and enclosing said pyrotechnical agent.

6. Joint as claimed in claim 5 in which holes are provided from the outside of the joint bar to said pyrotechnical agent for the ignition thereof.

References Cited

UNITED STATES PATENTS

| | | | |
|---|---|---|---|
| 934,711 | 9/1909 | Chapman | 29—498.5 X |
| 2,151,410 | 3/1939 | Richter | 277—26 |
| 2,491,700 | 12/1949 | Zwerling | 285—424 X |
| 2,961,363 | 11/1960 | Lowes | 285—21 X |
| 3,125,346 | 3/1964 | Poltorak | 277—1 |
| 3,251,912 | 5/1966 | Fish | 264—45 |
| 3,294,602 | 12/1966 | Francis et al. | 264—54 |
| 3,322,446 | 5/1967 | Koziol et al. | 264—45 |
| 3,334,557 | 8/1967 | Fitzgibbon | 264—45 |
| 2,667,865 | 2/1954 | Herman | 285—21 X |

FOREIGN PATENTS 243,931   5/1960   Australia.

CHARLIE T. MOON, Primary Examiner.

U.S. Cl. X.R.

156—79; 29—157, 460, 527; 264—45; 277—1; 285—424; 287—189.36